United States Patent
Yan

(10) Patent No.: US 7,657,946 B2
(45) Date of Patent: *Feb. 2, 2010

(54) METHOD FOR DEVICE DEPENDENT ACCESS CONTROL FOR DEVICE INDEPENDENT WEB CONTENT

(75) Inventor: Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/135,436

(22) Filed: Jun. 9, 2008

(65) Prior Publication Data

US 2008/0235811 A1 Sep. 25, 2008

Related U.S. Application Data

(63) Continuation of application No. 11/105,612, filed on Apr. 14, 2005.

(51) Int. Cl.
 *H04N 7/16* (2006.01)
(52) U.S. Cl. .......................................... 726/28; 726/29
(58) Field of Classification Search ................. 711/163; 726/28–29
 See application file for complete search history.

(56) References Cited

U.S. PATENT DOCUMENTS

| 6,041,412 | A * | 3/2000 | Timson et al. .................. 726/3 |
| 6,161,139 | A * | 12/2000 | Win et al. ................... 709/225 |
| 6,182,142 | B1 * | 1/2001 | Win et al. ................... 709/229 |
| 6,453,353 | B1 * | 9/2002 | Win et al. ................... 709/229 |
| 2002/0010679 | A1 * | 1/2002 | Felsher ......................... 705/51 |
| 2002/0147801 | A1 * | 10/2002 | Gullotta et al. ............. 709/223 |
| 2003/0037263 | A1 * | 2/2003 | Kamat et al. ................ 713/202 |
| 2003/0219127 | A1 * | 11/2003 | Russ et al. ................... 380/239 |
| 2003/0221012 | A1 * | 11/2003 | Herrmann et al. ........... 709/229 |
| 2004/0019799 | A1 * | 1/2004 | Vering et al. ................ 713/200 |
| 2004/0162894 | A1 * | 8/2004 | Griffin et al. ................ 709/223 |
| 2004/0162905 | A1 | 8/2004 | Griffin et al. |
| 2004/0162906 | A1 * | 8/2004 | Griffin et al. ................ 709/229 |
| 2005/0038688 | A1 * | 2/2005 | Collins et al. .................. 705/9 |
| 2006/0008256 | A1 * | 1/2006 | Khedouri et al. ........... 386/124 |
| 2006/0100912 | A1 * | 5/2006 | Kumar et al. ................... 705/4 |

OTHER PUBLICATIONS

Cheng, E.C., "An object-oriented organizational model ti support dynamic role-based access control in electronic commerce", Decision Support Systems, vol. 29, No. 4, Dec. 2000, Abstract.

* cited by examiner

*Primary Examiner*—Eleni A Shiferaw
(74) *Attorney, Agent, or Firm*—Yee & Associates, P.C.; David A. Mims, Jr.

(57) ABSTRACT

A method, an apparatus, and computer instructions are provided for device-dependent access control for device independent web content. In an illustrative embodiment, a module may be implemented in a computer program detects a client device and security level from a request for a resource by a client device. The module loads, from a data source or configuration file, a three-dimensional device dependent access control matrix, which includes a user role axis, a device axis, and a resource axis. Based on the security level of the device indicated by the device matrix, the module grants or denies access to the resource by the user device. The security levels may include security protocols implemented by different devices, encryption schemes implemented by different devices, and security patches applied by the same device.

14 Claims, 3 Drawing Sheets

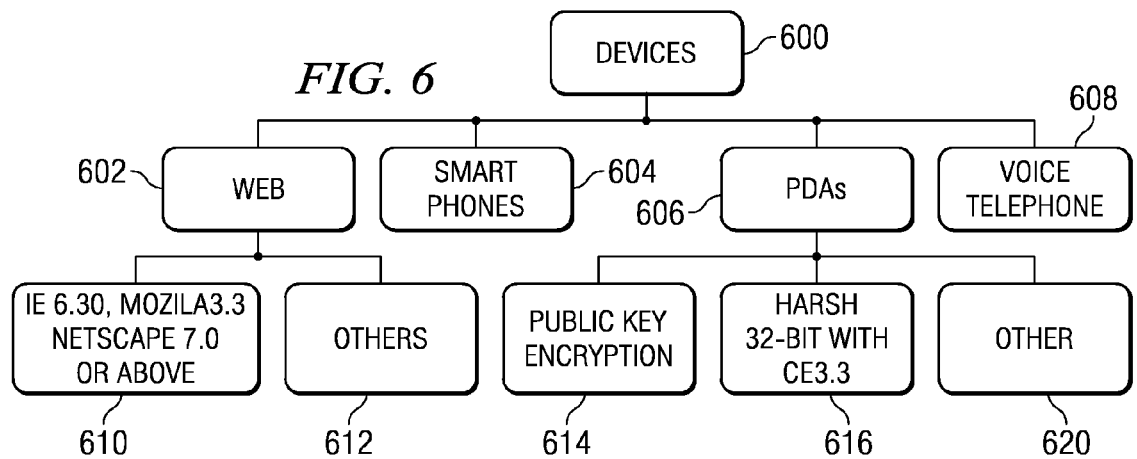
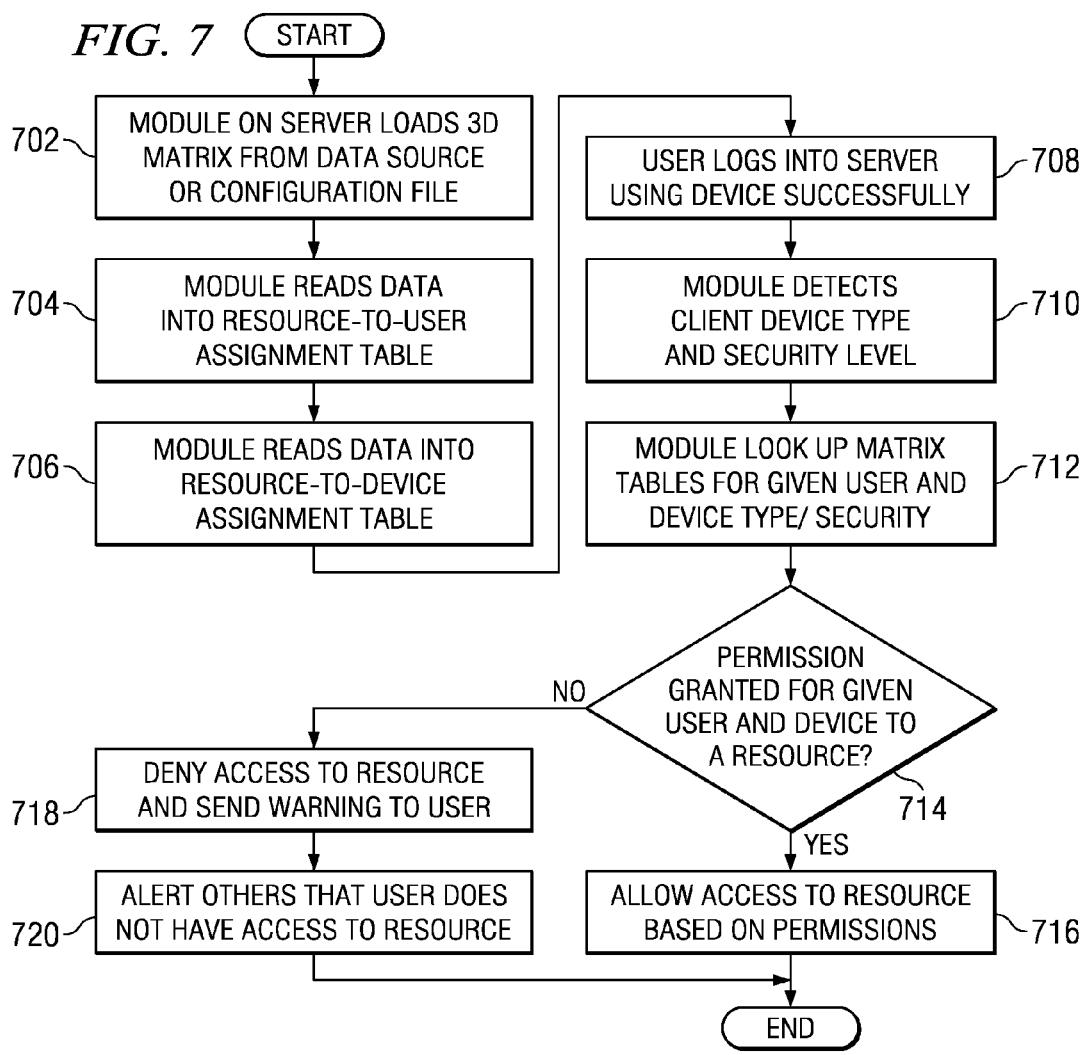

METHOD FOR DEVICE DEPENDENT ACCESS CONTROL FOR DEVICE INDEPENDENT WEB CONTENT

This application is a continuation of application Ser. No. 11/105,612, filed Apr. 14, 2005, status pending.

BACKGROUND OF THE INVENTION

1. Technical Field

The present invention relates to an improved data processing system. In particular, the present invention relates to providing access control to resources of a data processing system. Still more particular, the present invention relates to providing device dependent access control for device independent Web content in a data processing system.

2. Description of Related Art

In the current market, a variety of handheld or pervasive devices are available for consumers. Examples of pervasive devices include Web browsers, personal digital assistants (PDAs), smart phones, and traditional voice telephones. These devices support different security protocols, resources, and input capability. For example, a PDA may support input by a pen, while a traditional voice telephone only supports input by voice.

These devices may also have different screen sizes and bandwidth requirements. These variations present challenges in security and resource control for applications that support these devices. For example, a resource, such as a spreadsheet or a chart image, accessible by a user through a Web browser may not be available for the same user accessing through a smart phone, because either the resource is so sensitive that it should only be available to a secured smart phone or that the smart phone does not support the resource data format. A resource may be any data that is available in a given device, for example, an application, a Web page, a spreadsheet, or a data set.

Modern Web applications often adopt a device-independent approach to support various devices. In the device-independent approach, the page content containing business logic is independent from the display on a client device and is tailored to any device for display during run-time based on the device capability. The device-independent approach gives all the devices the same access privilege to a resource.

Traditionally, role-based access control may be used in applications for controlling resource access. Role-based access control is a standard security policy that is applied for many applications, including J2EE based applications. Role-based access control uses a two-dimensional matrix mechanism to control resource access. The two dimensional matrix includes a user role axis that has a list of user roles and a resource axis that has a list of resources. The list of user roles may include administrator, manager, editor or user. The list of resources may include Web page, data set, application, or any combination of the above. The content of the two dimensional matrix includes access rights or permissions assigned to a specific user for a given resource, for example, view, edit, or update.

While role-based access control solves the problem of who can access what resource, it does not distinguish users with different devices. Thus, a user that uses a smart phone is given the same access to a resource as the same user using a voice telephone. As more and more devices are introduced in the market, device capabilities and security becomes an issue. Different devices may have implemented different security protocols, and different encryption schemes, and applied different security patches. There is currently no existing mechanism that solves the problem of who and which device can access what resource. Thus, sensitive data that is only supposed to be delivered to a secured device may end up in an unsecured device.

In addition to role-based access control, programming-based access control can also be used in applications for controlling resource access. Programming-based access control allows security control to be hard-coded in a program. However, in order to add or change a device's access permissions, the user has to manually change the program code. There is no existing mechanism that dynamically configures new devices introduced in the market or removes existing devices for access control without modifying the program.

Therefore, it would be advantageous to have an improved method to control Web resources based not only on user role, but also on device security to achieve fine-grained access control, such that sensitive data may only be delivered to secured devices. In addition, it would be advantageous to have an improved method for adding or removing devices without the need to change the program code.

SUMMARY OF THE INVENTION

The present invention provides a method, an apparatus, and computer instructions in a data processing system for device dependent access control for device independent Web content. The present invention provides a module that detects the device type and security level from a request for access to a resource of the data processing system by a user device, and loads a three-dimensional matrix from a data source, a configuration file, or any other types of resource.

The module then performs a lookup of the matrix based on a user role of the user device, a type and security level of user device, and the resource requested, and determines based on one of a plurality of devices of the device axis. If permission is granted to the user device, the module allows the user device to access the resource based on the permission. However, if the permission is not granted, the module denies the user device access to the resource and sends a warning to the user device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram illustrating an exemplary grouping of devices in accordance with an illustrative embodiment of the present invention; and FIG. 7 is a flowchart of an exemplary process for device dependent access control for device independent Web content in accordance with an illustrative embodiment of the present invention.

DETAILED DESCRIPTION OF THE PREFERRED EMBODIMENT

Figure 1:
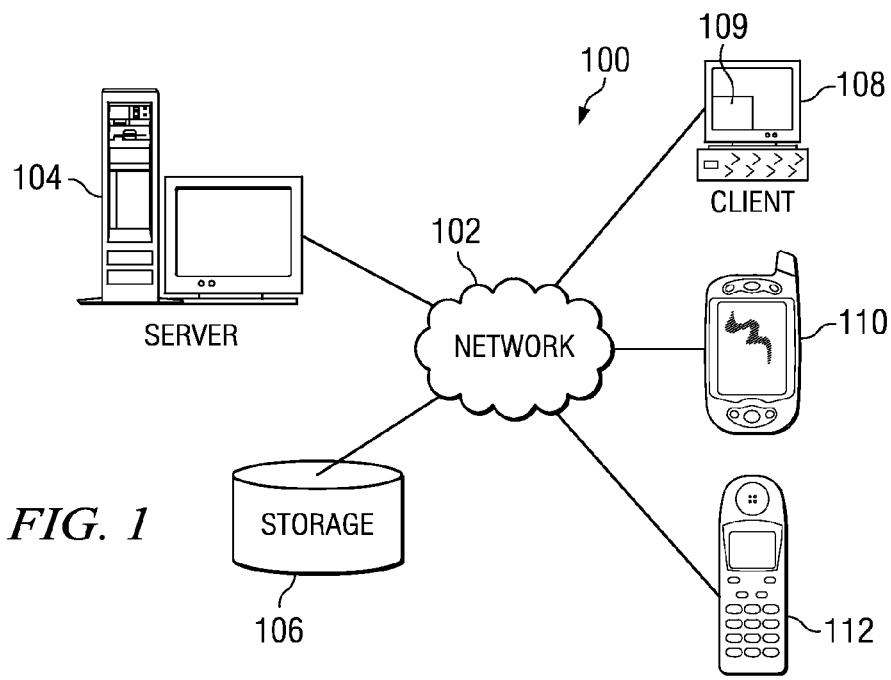
FIG. 1 depicts a pictorial representation of a network of data processing systems in the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, client 108, personal digital assistant 110, and smart phone 112 are connected to network 102. Client 108 may be, for example, personal computers or network computers. In the depicted example, server 104 provides data, such as boot files, operating system images, and applications to client 108. Examples of applications in client 108 includes Web browsers 109, which process Web based content from server 104 and displays it to the user. Since the Web content is device independent, other types of applications similar to Web browsers 109 may reside in personal digital assistant 110 and smart phone 112 for processing the device independent Web content received from server 104.

Client 108, personal digital assistant 110, and smart phone 112 are clients to server 104. Network data processing system 100 may include additional servers, clients, and other devices not shown, for example, traditional voice telephone or other mobile devices. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
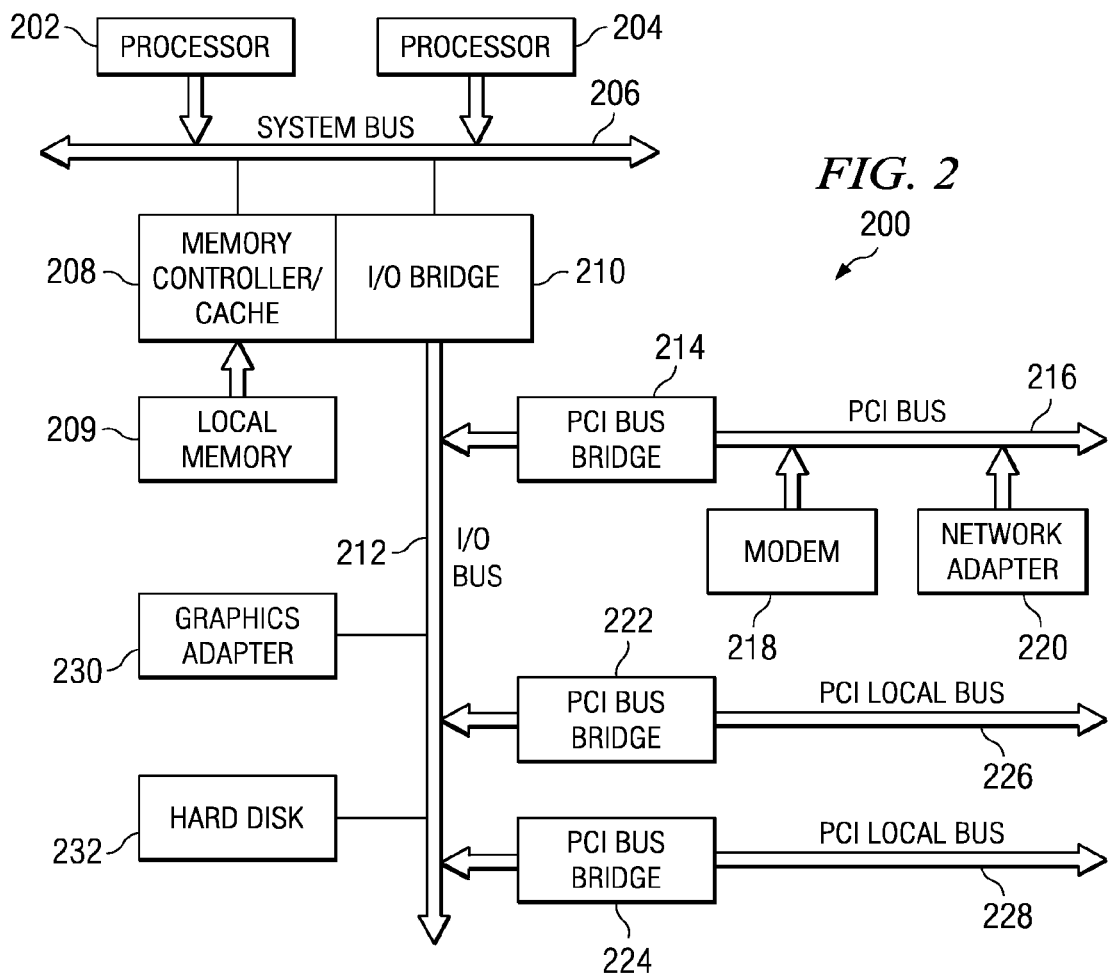
FIG. 2 a block diagram of a data processing system that is depicted in accordance with an illustrative embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

The present invention provides a method, apparatus, and computer instructions for device dependent access control for device independent Web content. In an illustrative embodiment, the present invention may be implemented as a module of a computer program executed by data processing system 200 in FIG. 2. The present invention extends the two dimensional matrix in the traditional role-based access control to a three-dimensional matrix. In addition to user role and resource axis, the three-dimensional matrix includes a third axis, device, which has a list of devices used by a given user and can access a given resource. Thus, access permission to a resource is controlled by user role as well as the device the user uses.

With the third axis, an administrator may group devices based on their security level. A device may belong to one or more groups, with each group representing a different security level. For example, Web browser device Internet Explorer™ 5.0 may belong to a different group than Web browser device Internet Explorer™ 5.0.5, since Internet Explorer™ 5.0.5 has several security patches applied. As the number of devices introduced in the market increases, grouping devices based on their security level helps ease management and configuration of the devices.

An administrator may define the security levels of devices in terms of the following: security protocols implemented by different devices, encryption scheme used by different devices, security patch applied by the same device, etc. With the role and device-based three-dimensional matrix access control module, a user may transfer sensitive data to a secured device rather than an unsecured device. In addition, an administrator may temporarily remove or disable a device access to a resource in case of a suspicious virus attack while a user can still use other devices to access the same resource. For example, if a prevailing household Pocket PC IE virus is common among Pocket PC devices, an administrator may disable the Pocket PC devices to which a required security patch is not applied while at the same time giving other Pocket-PC devices with the security patches applied access to the resources using the module, since the module has the capability of disabling devices based on security patch applied. Furthermore, an administrator may easily grant or deny access right to a new device, when it is introduced in the market into the operating environment.

In an illustrative embodiment, an administrator may configure the three-dimensional matrix via a user interface. For each resource in the server, the user interface may display a list of all supported devices and potential permissions, including view, edit, update, add, or deploy, in a matrix format. With the user interface, an administrator may grant or deny permission to each device based on the security level of the device. The matrix is preferably stored in a data source or a configuration file, such as an extensible markup language file, and the module reads into a resource-to-device assignment table at run time. However, an administrator may store the matrix using other forms and in other types of storage without departing the spirit and scope of the present invention.

Figure 3:
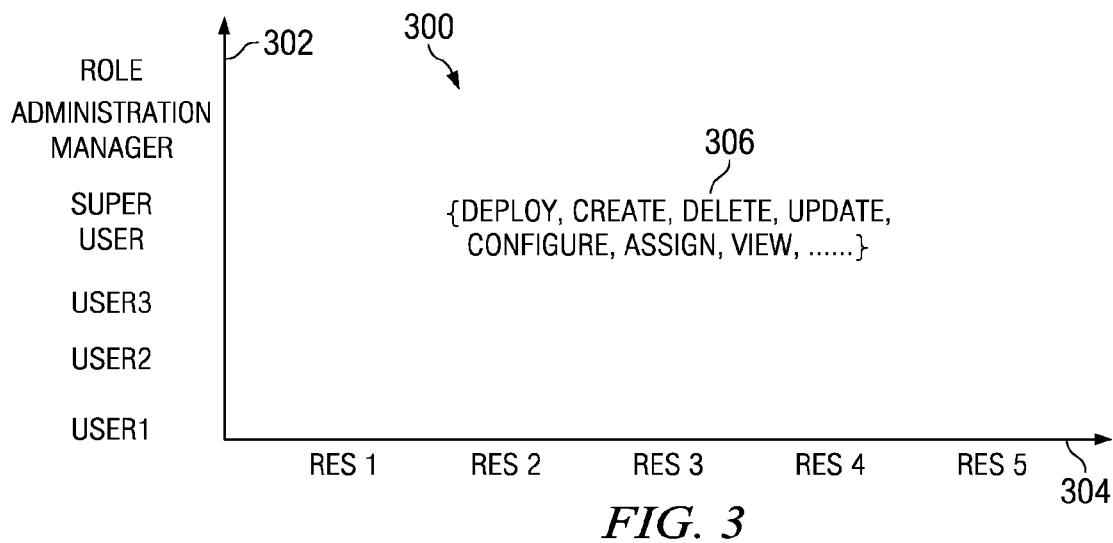
FIG. 3 is a diagram illustrating a known user role-based access control two dimensional matrix.

Turning now to FIG. 3, a prior art diagram illustrating a known user role-based access control two dimensional matrix is depicted. As shown in FIG. 3, matrix 300 is a two-dimensional matrix that includes user role axis 302 and resource axis 304. The content of matrix 306 includes access permissions to a resource, such as deploy, create, delete, update, configure, assign, or view.

If a user has access permission to a resource, he or she may access the resource using any device supported by the server since the web server provides device-independent web content for the client. Prior to the present invention, there was no current method that allows the user to access confidential data using Pocket PC 2003 instead of Pocket PC 2002, for instance. Windows mobile Pocket PC is an operating system for Pocket PCs personal digital assistants, available from Microsoft Corporation. Thus, user role-based access fails to fine tune resource access based on device security.

Figure 4:
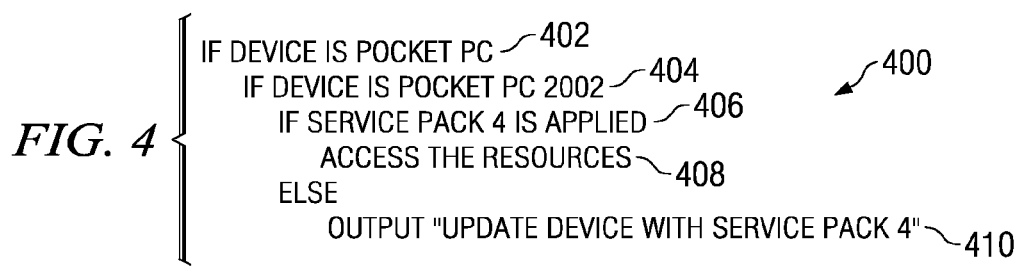
FIG. 4 is a diagram illustrating a known programming based access control two dimensional matrix.

Turning now to FIG. 4, a prior art diagram illustrating a known programming based access control two dimensional matrix is depicted. As shown in FIG. 4, program 400 determines access control to a resource in multiple levels. First, program 400 checks to see if a detected device is a Pocket PC 402.

If the detected device is a Pocket PC, program 400 then checks to see if the detected device is Pocket PC 2002 404, an example of a device model. If the detected device is Pocket PC 2002 404, program 400 further checks to see if Pocket PC 2002 Security Patch 4 has been applied on the device 406. If the security Pack has been applied, program 400 allows the user to access the resource using the Pocket PC 2002 device 408. Otherwise, program 400 outputs the message "update your device with the security pack 4" to the user to warn of a device update 408.

While program 400 provides multi-level validations, if an administrator wants to add or remove the device's access permissions, the administrator has to manually change the program 400. Prior to the present invention, there was no existing method that allows an administrator to add additional models or browser versions without modifying program 400.

Figure 5:
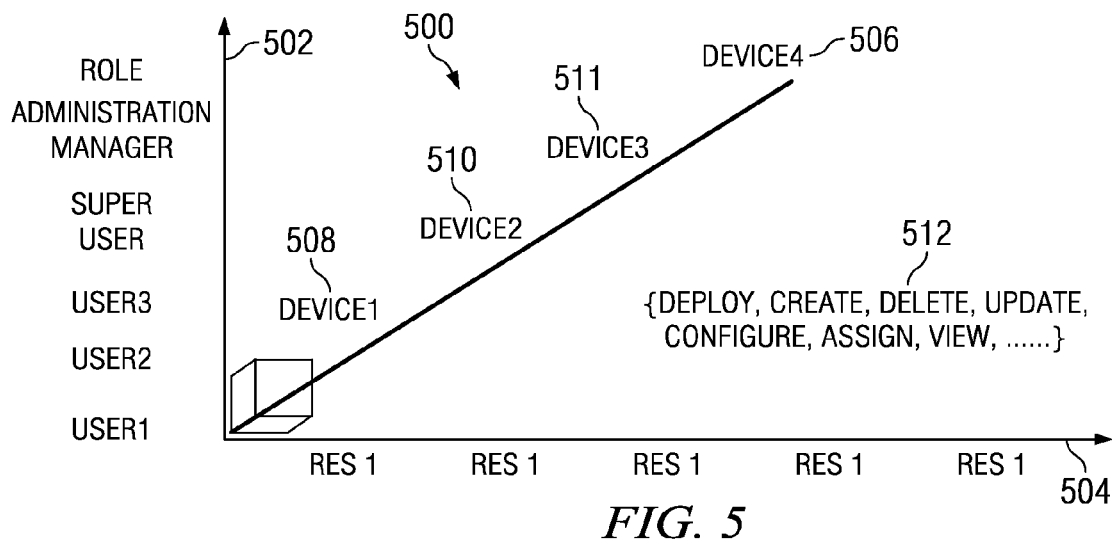
FIG. 5 is a diagram illustrating device dependent access control three-dimensional matrix in accordance with an illustrative embodiment of the present invention.

Turning now to FIG. 5, a diagram illustrating device dependent access control three-dimensional matrix is depicted in accordance with an illustrative embodiment of the present invention. As shown in FIG. 5, matrix 500 is a three-dimensional matrix that includes user role axis 502, resource axis 504, and device axis 506. Similar to two-dimension matrix 400 in FIG. 4, content of matrix 512 includes access permissions to a resource, such as deploy, create, delete, update, configure, assign, or view.

In addition to a list of individual devices, device axis 506 may represent security levels of different devices. For example, different devices may implement or adopt different security protocols, and encryption schemes. The same type of devices may be applied different security patches. Examples of security protocols include proprietary protocol specific to device, Secure Sockets Layer (SSL) and Wireless Transaction Level Security (WTLS), etc. Examples of encryption schemes include 32-bit, 64-bit, or 128-bit key encryption etc. Examples of security patch applied include those published by the vendors for their specific devices, as normally indicated by device browser version, such as Internet Explorer™ 5.0 and 5.0.5. The higher browser version is generally securer than a lower browser version.

In this illustrative example, if device axis 506 represents individual devices, device 1 508 may represent a PDA while device 2 510 may represent a smart phone. Alternatively, if device axis 506 represents security protocols, device 1 508 may represent a wireless access protocols (WAP) device without WTSL, while device 2 510 represents a WAP device with WTSL. If device axis 506 represents devices with different security patches applied, device 1 508 may represent Internet Explorer™ 5.0, while device 2 may represent Internet Explorer™ 5.0.5. If device axis 506 represents encryption schemes, device 1 508 may represent a device with 32-bit key encryption, while device 2 510 may represent device with 64-bit key encryption. In addition, device axis 506 may represent devices or device groups with different security levels, which is a combination of security protocols, and encryption schemes and security patches applied. For instance, device 1 508 may represent a Web browser with Internet Explorer (IE) 5.0, a PDA with a 32-bit key encryption, and a WAP phone without WTSL. Device 2 510 may represent a Web browser with IE 5.0.5, a PDA with 64-bit encryption, and a WAP phone with WTSL. Device 3 511 may represent a Web browser with IE 6.0 and using SSL, a PDA with 128-key encryption and WTSL, etc.

With device axis 506, an administrator may control access to resources based on security levels of the individual devices used by the user, in addition to user roles. Thus, a user may transfer sensitive data only to secured device, rather than non-secured ones. An administrator may disable access of a device infected with suspicious viruses to resources. In addition, an administrator may grant or deny access right to a new device without the need to modify the program code.

Turning now to FIG. 6, a diagram illustrating an exemplary grouping of devices is depicted in accordance with an illustrative embodiment of the present invention. As shown in FIG. 6, an administrator may group devices 600 according to their types. In this example, types of devices include Web browsers 602, smart phones 604, PDAs 606, and voice telephones 608.

Next, the administrator may group devices based on their security levels. In this example, the administrator may group Web browsers 602 further based on the type and version of the browsers 610, for example, Internet Explorer™ 6.3, Netscape™ 7.0, and Mozilla 3.3. Web browsers 602 may also be grouped by other parameters, for instance, the encryption schemes (128-bit, 64-bit or 32-bit key encryption etc.) 612.

Similarly, the administrator may group PDAs 606 based on their security level, such as encryption scheme. In this example, the administrator may group PDAs 606 further based on whether the encryption scheme the PDA uses is a public key encryption 614 or Hash 32-bit with CE 3.3 encryption 616. In addition, the administrator may group PDAs 606 based on other parameters. For example, browser levels (Pocket Internet Explorer 2.0, Pocket Internet Explorer 3.0 etc.)

Turning now to FIG. 7, a flowchart of an exemplary process for device dependent access control for device independent Web content is depicted in accordance with an illustrative embodiment of the present invention. As shown in FIG. 7, the process begins when the device dependent access control module loads the three-dimensional matrix during the startup of the program from either a data source or a configuration file (step 702). The module then reads data into a resource-to-user assignment table (step 704) and resource-to-device assignment table (step 706). After a user logs into the server successfully (step 708), the device dependent access control module on a server detects the client device type and security level (step 710). Based on the user role, device type and security levels in the matrix assignment tables, the module looks up the matrix tables for a given user and a given device type or security for the specific resource (step 712) and determines if the combination has access to a resource based on the permissions in the content of the matrix (step 714)

If the combination has access to the resource based on the permissions, the module allows access to the resource based on permissions (step 716). For example, if a user and device has "view" access to the resource, the module grants "view" access only. Otherwise, if the combination does not have access to the resource based on the permissions, the module denies access to the resource and sends a warning to the user (step 718). Others may be alerted that the subject device does not have the permissions to access the resource (step 720).

In summary, the present invention provides a method, apparatus and computer instructions for device dependent access control for device independent Web content. With the present invention, an administrator may grant access to resources based on a security level of a user device. The present invention allows the administrator to use a variety of security levels as criteria for access control. In addition, administrators may grant or deny access to resources for new devices that are recently introduced in the market. Furthermore, the present invention protects sensitive data intended only for secured devices.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for device dependent access control for device independent content, the method comprising:

a processor storing instructions therein and when executed performing steps of detecting a device type of a user device and a security level of the user device from a request for access to a resource of the data processing system by the user device, responsive to a user device login;

loading a three-dimensional matrix from one of a data source and a configuration file, wherein the three-dimensional matrix includes a user role axis, a device axis, and a resource axis, wherein the device axis comprises a list of devices used by a given user;

performing a lookup of a plurality of matrix assignment tables based on a user role of the user device, the device type of the user device, and the resource requested by the user device;

determining, based on one of a plurality of devices of the device axis, if permission is granted to the user device, wherein the plurality of devices is grouped by the device type of each device into groups, with each group of the groups including given ones of the plurality of devices having a same device type;

wherein the plurality of devices represent a plurality of security levels, wherein the plurality of security levels include a security protocol implemented in different devices of the plurality of device, an encryption scheme implemented in the different devices, a security patch applied in a device of the plurality of devices, and a combination of the security protocol, the encryption scheme, and the security patch applied;

wherein the plurality of devices is further grouped by a security level of the each device into subgroups, with each subgroup of the subgroups including given ones of the plurality of devices having a same security level; and if the permission is granted, allowing the user device to access the resource; and if the permission is not granted, denying the user device access to the resource and sending a warning to at least one of the user device and another user device.

2. The method of claim 1, wherein the user role includes at least one of an administrator, a user, and a manager.

3. The method of claim 1, wherein the type of user device includes a personal digital assistant, a web browser, a smart phone, and a telephone.

4. The method of claim 1, wherein the resource requested include at least one of an application, a data set, a web page, and a spreadsheet.

5. The method of claim 1, wherein the permission includes at least one of deploy, create, delete, update, assign, view, and configure.

6. The method of claim 1, wherein the security protocol implemented in different devices includes at least one of a proprietary security protocol, and a secure sockets layer (SSL) protocol.

7. The method of claim 1, wherein the security level comprises a type and version of an application executable by the each device, and an encryption scheme used by the application executable by the each device.

8. The method of claim 1, wherein the security patch applied in a device includes security patches published by vendors for specific devices.

9. The method of claim 1, wherein the detecting, loading, determining, allowing, and denying steps are performed by a module implemented in a computer program executed by the data processing system, and wherein the three-dimensional matrix is configured by the administrator via a user interface to add a new device after the module is created, and determining permission to access a given resource by the new device is enabled by the method without modifying the module by use of the configured three-dimensional matrix.

10. The method of claim 1, wherein the loading step comprises:
reading data from the three-dimensional matrix into a resource-to-user assignment table; and
reading data from the three-dimensional matrix into a resource-to-device assignment table that indicates what resources are accessible according to the type of user device.

11. A data processing system comprising:
a bus;
a memory connected to the bus, wherein a set of instructions are located in the memory; and
a processor connected to the bus, wherein the processor executes the set of instructions to (i) detect a device type of a user device and a security level of the user device from a request for access to a resource of the data processing system by the user device, responsive to a user device login, (ii) load a three-dimensional matrix from one of a data source and a configuration file, wherein the three-dimensional matrix includes a user role axis, a device axis, and a resource axis, (iii) perform a lookup of a plurality of matrix assignment tables based on a user role of the user device, the device type of the user device, and the resource requested by the user device, (iv) determine, based on one of a plurality of devices of the device axis, if permission is granted to the user device, wherein the plurality of devices is grouped by the device type of each device into groups, with each group of the groups including given ones of the plurality of devices having a same device type, (v) allow the user device to access the resource if the permission is granted, and (vi) deny the user device access to the resource and send a warning to at least one of the user device and another user device if the permission is not granted; and
wherein the plurality of devices represent a plurality of security levels, wherein the plurality of security levels include a security protocol implemented in different devices of the plurality of device, an encryption scheme implemented in the different devices, a security patch applied in a device of the plurality of devices, and a combination of the security protocol, the encryption scheme, and the security patch applied;
wherein the plurality of devices is further grouped by a security level of the each device into subgroups, with each subgroup of the subgroups including given ones of the plurality of devices having a same security level.

12. The data processing system of claim 11, wherein the processor, in executing the set of instructions to load a three-dimensional matrix from one of a data source or a configuration file, reads data from the three-dimensional matrix into a resource-to-user assignment table, and reads data from the three-dimensional matrix into a resource-to-device assignment table that indicates what resources are accessible according to the type of user device.

13. A computer program product stored in a computer recordable-type medium for device dependent access control for device independent web content, the computer program product comprising:
first instructions for detecting a device type of a user device and a security level of the user device from a request for access to a resource of a data processing system by the user device, responsive to a user device login;
second instructions for loading a three-dimensional matrix from at least one of a data source or a configuration file, wherein the three-dimensional matrix includes a user role axis, a device axis, and a resource axis;
third instructions for performing a lookup of a plurality of matrix assignment tables based on a user role of the user device, the device type of the user device, and the resource requested by the user device;
fourth instructions for determining, based on one of a plurality of devices of the device axis, if permission is granted to the user device, wherein the plurality of devices is grouped by the device type of each device into groups, with each group of the groups including given ones of the plurality of devices having a same device type;
fifth instructions for allowing the user device to access the resource if the permission is granted; and
sixth instructions for denying the user device access to the resource and sending a warning to at least one of the user device and another user device if the permission is not granted; and
wherein the plurality of devices represent a plurality of security levels, wherein the plurality of security levels include a security protocol implemented in different devices of the plurality of device, an encryption scheme implemented in the different devices, a security patch applied in a device of the plurality of devices, and a combination of the security protocol, the encryption scheme, and the security patch applied;
wherein the plurality of devices is further grouped by a security level of the each device into subgroups, with each subgroup of the subgroups including given ones of the plurality of devices having a same security level.

14. The computer program product of claim 13, wherein the second instructions comprises:
first sub-instructions for reading data from the three-dimensional matrix into a resource-to-user assignment table; and
second sub-instructions for reading data from the three-dimensional matrix into a resource-to-device assignment table that indicates what resources are accessible according to the type of user device.

* * * * *